United States Patent

Wu

Patent Number: 5,372,108
Date of Patent: Dec. 13, 1994

[54] ENGINE CHARGE CONTROL SYSTEM AND METHOD

[75] Inventor: Ko-Jen Wu, Troy, Mich.

[73] Assignee: General Motors Corporation, Detroit, Mich.

[21] Appl. No.: 93,929

[22] Filed: Jul. 20, 1993

[51] Int. Cl.⁵ .............................................. F01L 1/34
[52] U.S. Cl. .................................. 123/311; 123/315; 123/90.15; 123/90.18
[58] Field of Search ................... 123/311, 315, 90.15, 123/90.16, 90.17, 90.18, 90.23, 52 MP

[56] References Cited

U.S. PATENT DOCUMENTS

| | | | |
|---|---|---|---|
| 4,422,416 | 12/1983 | Bernardoni | 123/52 MF |
| 4,700,684 | 10/1987 | Pischinger et al. | 123/90.11 |
| 4,873,949 | 10/1989 | Fujiyoshi et al. | 123/90.12 |
| 4,955,329 | 9/1990 | D'Angelo et al. | 123/52 MF |
| 4,986,225 | 1/1991 | Wu et al. | 123/52 MF |
| 4,991,547 | 2/1991 | Davis et al. | 123/52 MF |
| 4,995,351 | 2/1991 | Ohkubo et al. | 123/90.15 |
| 5,005,552 | 4/1991 | Kawamura | 123/90.15 |
| 5,031,582 | 7/1991 | Kruger | 123/90.15 |
| 5,090,364 | 2/1992 | McCarroll et al. | 123/90.16 |
| 5,170,755 | 12/1992 | Kano et al. | 123/90.17 |
| 5,224,460 | 7/1993 | Havstad et al. | 123/90.16 |
| 5,253,622 | 10/1993 | Bornstein et al. | 123/90.18 |
| 5,263,443 | 11/1993 | Schecter et al. | 123/90.17 |

Primary Examiner—Tony M. Argenbright
Assistant Examiner—M. Macy
Attorney, Agent, or Firm—Robert J. Outland

[57] ABSTRACT

An engine charge control system operates by initially reducing power from full load by retarding exhaust valve closing timing to increase exhaust gas charge dilution up to the limit for efficient operation. Further load reductions are made by reducing charge mass without increased dilution via alternative steps such as throttling (in conjunction with intake check valves or using individual cylinder valves) or retarding intake valve opening timing without throttling. Partial substitution of external charge dilution is also contemplated.

24 Claims, 10 Drawing Sheets

ENGINE CHARGE CONTROL SYSTEM AND METHOD

TECHNICAL FIELD

This invention relates to external ignition or spark ignition internal combustion engines and, more particularly, to induction system charge control means and methods.

BACKGROUND

It is known in the art relating to engines to control the cylinder intake charges by various means and methods. These include intake manifold or individual cylinder throttling, variable intake and/or exhaust valve timing, auxiliary non-return or check valves (preferably reed valves) in the cylinder intake runners among others.

SUMMARY OF THE INVENTION

The present invention combines certain of the previously known means and provides methods for their operation in the control of engine speed and load that may improve engine operating efficiency and/or emission control over substantial portions of the load range.

A preferred embodiment combines variable timing of cylinder exhaust valve closing with manifold intake throttling and auxiliary cylinder intake check valves with optional bypass and an operating method that maintains efficient operating conditions over the load range.

A preferred operating method includes:

full load operation with fully open throttle and full power valve timing;

reduced load operation in a high load range by delaying of exhaust valve closing to a first limit within a favorable combustion zone;

optional further reduced load operation in an intermediate load range by throttling to reduce manifold pressure while substantially maintaining delayed exhaust valve closing at the first limit; and lower reduced load operation in a low load range obtained by further throttling to reduce manifold pressure while advancing exhaust valve closing from the first limit to near the initial full power valve timing at engine idle.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
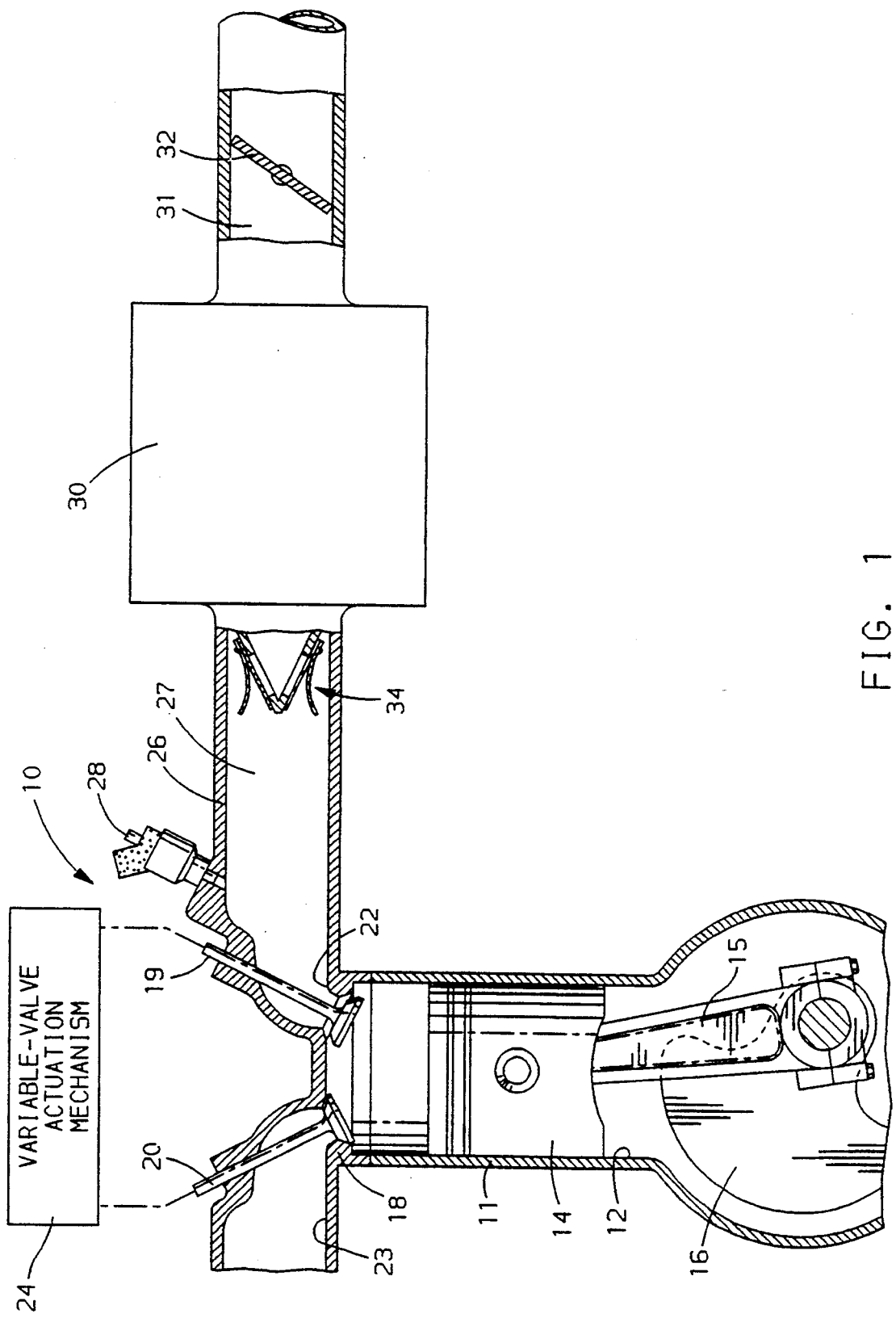
FIG. 1 is a schematic view of an engine with a simplified embodiment of charge control system according to the invention.

Referring now to FIG. 1 of the drawings in detail, numeral 10 generally indicates a spark ignited four stroke cycle internal combustion engine. The engine includes a cylinder block 11 having multiple cylinders 12, only one being shown. Each cylinder has a piston 14 reciprocable therein and connected by a connecting rod 15 to a crankshaft 16.

A cylinder head 18 closes the end of the cylinder 12 above the piston and includes at least one intake valve 19 and one exhaust valve 20 respectively controlling an intake port 22 and an exhaust port 23 connecting with the cylinder. Variable timing valve actuation means 24 are provided of any suitable type.

The intake port 22 connects with a manifold runner 26 to define an intake passage 27 into which fuel is sprayed by a fuel injector 28. Upstream, an intake plenum 30 connects with each of the passages 27 and with an air intake tube 31 having a main throttle 32 of the butterfly type. An auxiliary one way or check valve such as a reed valve 34 is located in each of the intake passages 27 between the plenum and the fuel injector 28. The presence of the reed valves prevents or limits backflow of gases from the engine cylinders into the intake manifold plenum and thus permits use of camshaft phase control timing of all the valves to obtain the desired retarding of the exhaust valve closing event which is utilized in this invention.

Figure 2:
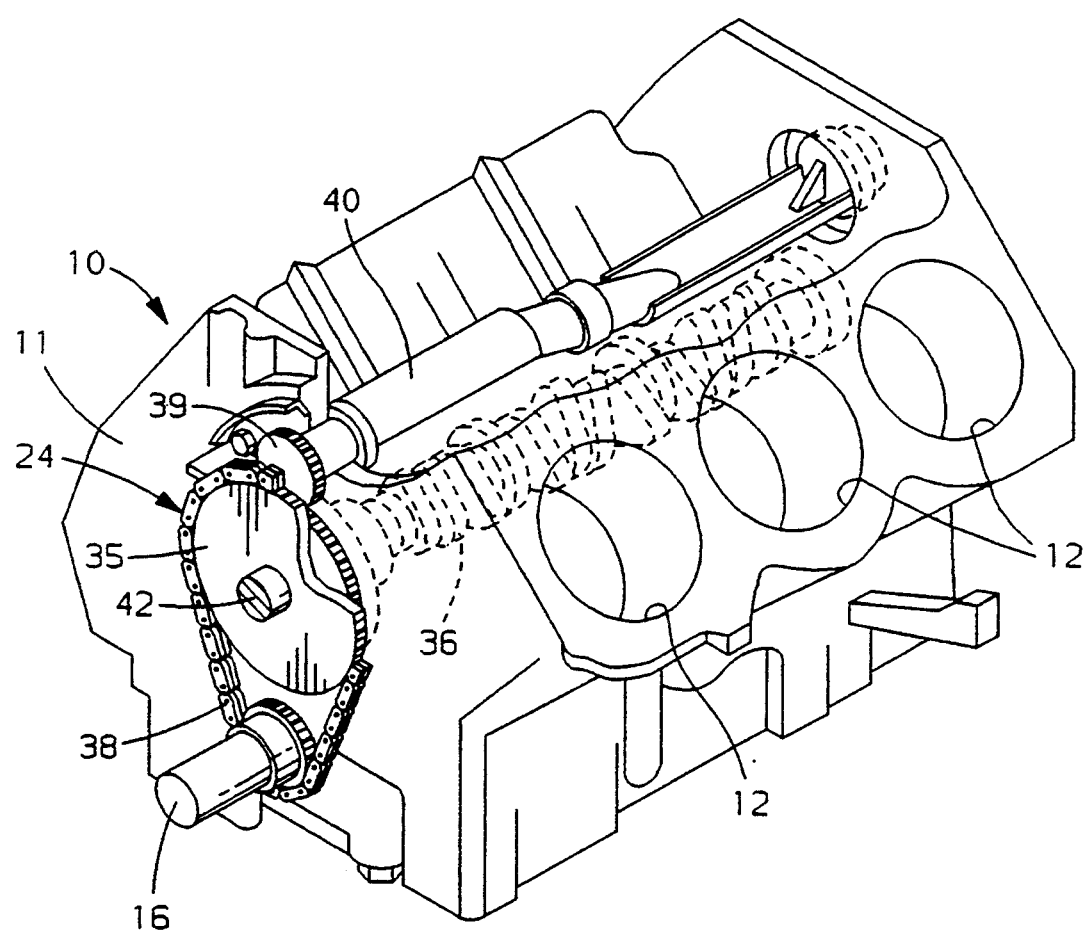
FIG. 2 is a pictorial view of portions of an engine incorporating the system of FIG. 1.

In an embodiment preferred for its simplicity and illustrated in FIG. 2, the variable timing valve actuation means 24 comprises a cam phaser 35 capable of varying the phase angle of the camshaft 36 (which actuates both the intake and exhaust valves 19, 20 through valve gear not shown) relative to the phase angle of the crankshaft 16 by which the camshaft is driven. The phaser 35 is driven by the crankshaft through a chain 38 and is in turn connected through a gear train 39 to drive a balance shaft 40 at crankshaft speed with a fixed phase angle. An internal planetary gear mechanism in the phaser is adjustable through a control shaft 42 to vary the camshaft phase angle. Details of an engine application including a phaser of this type are found in copending U.S. patent application Ser. No. 08/074,439 filed Jun. 9, 1993.

Figure 3:
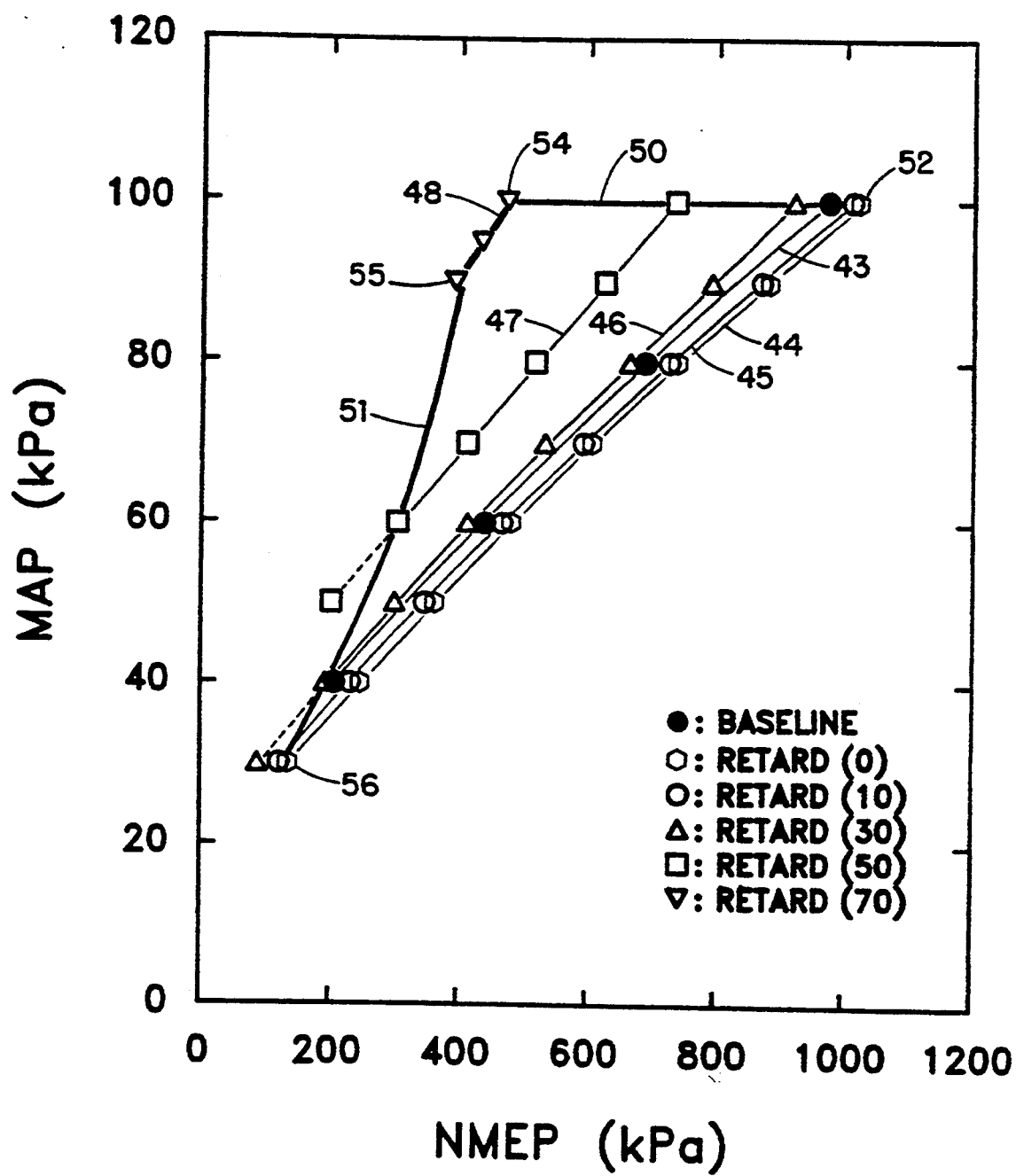
FIG. 3 is a graph of engine load vs manifold air pressure for a method of operating the engine of FIG. 1.

The preferred method of operation of the engine 10 of FIGS. 1 and 2 is illustrated in FIG. 3 which shows computer simulated operational data where the engine load, represented by net mean effective cylinder pressure (NMEP), is charted against manifold air pressure (MAP), which indicates relative throttle position.

The fine lines 43, 44, 45, 46, 47 indicate operation over the range of throttle settings and, respectively, at a baseline of 0° without check valves, and then with check valves at 0°, 10°, 30° and 50° retard of the exhaust valve closing timing which, in this case, represents retarding of the timing of all the valves, intake and exhaust. The dashed portions of the lines indicate zones wherein inefficient combustion would result.

The short sloping segment 48 of the heavy line represents operation with reducing throttle opening downward of the line at 70° of valve timing retard, which is chosen as the operating limit in this case to assure that the intake valves are closed when ignition of the cylinder charges occurs. The horizontal upper segment 50 of the heavy line represents operation at constant throttle position (constant MAP) with valve timing (exhaust valve closing) varying between 0° and 70° retard. The sloping lower segment 51 of the heavy line represents operation with reduced throttle opening downward of the line while the valve timing is being advanced back toward the full load setting.

The heavy line 50, 48, 51 of FIG. 3 represents the preferred conditions for operating the engine at a selected speed over its complete load range. A different set of conditions will exist for each operating speed or increment within the engine operating speed range. Reduction of power in FIG. 3 from full load to near idle is as follows. Point 52 indicates engine operation at full load or power output (1000 kPa NMEP at 100 kPa MAP). Here the main throttle is held fully open and the camshaft timing is set to obtain maximum power. The cams provide considerable overlap of the valve open periods for each cylinder to maximize the intake charge at peak output speed.

To reduce engine load down to about 460 kPa NMEP, the exhaust valve closing timing is retarded progressively along segment 50 up to 70° to point 54 while throttle position is held constant.

Since 70° is the maximum retard allowed for this embodiment, further power reduction down to about 400 kPa NMEP is obtained by moving along segment 48 to point 55 through partially closing the throttle (reducing MAP) while holding valve timing retard constant at 70°.

Further power reduction is along segment 51 to point 56 and combines gradual closing of the throttle with corresponding advance of the valve timing from the retarded condition back to or near the initial operating condition, the operating conditions along the segment 51 being controlled to maintain combustion conditions at their most efficient points within the efficient operating zone bordered by segment 51.

ALTERNATIVE EMBODIMENTS

Figure 4:
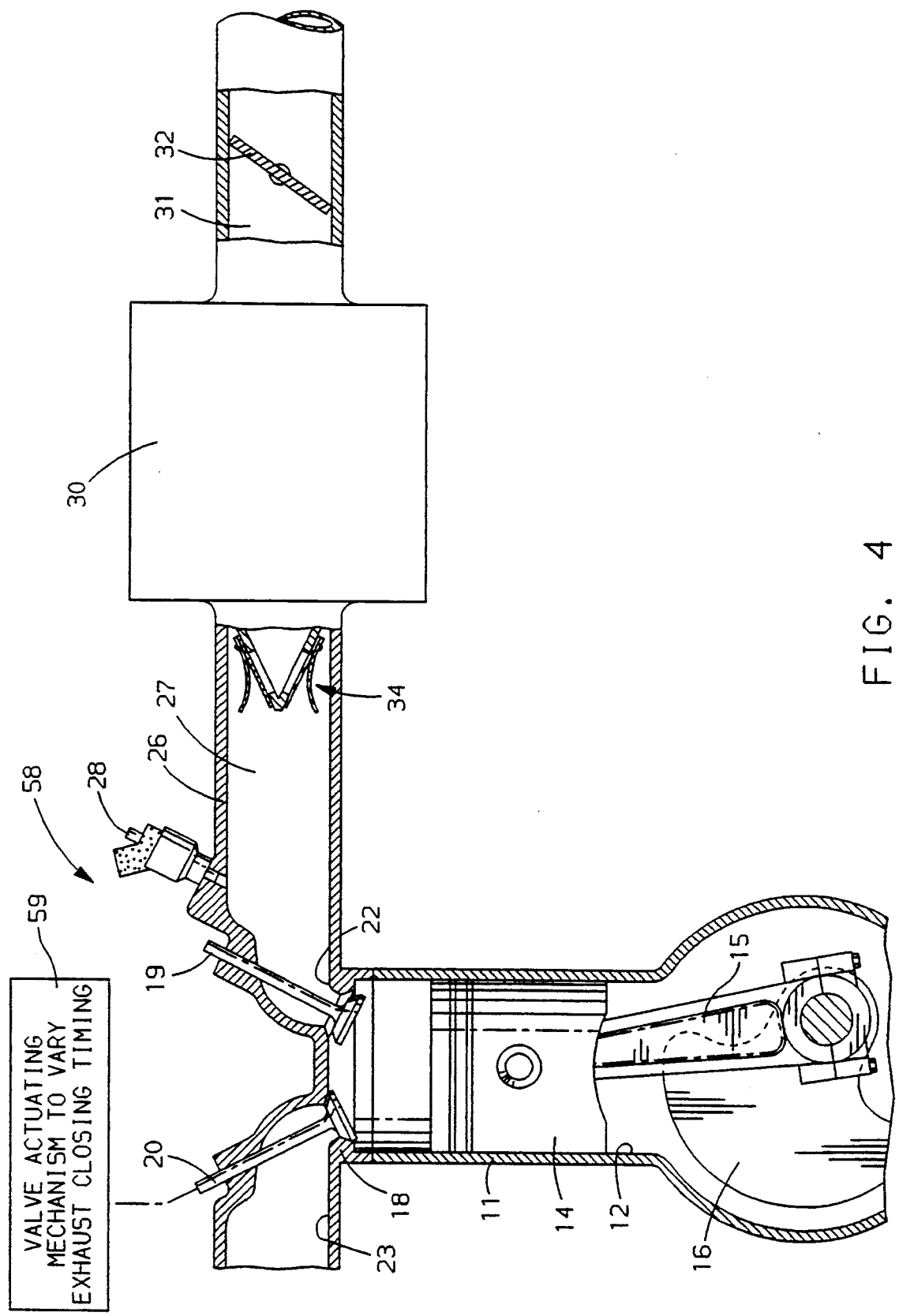
FIG. 4 is a schematic view showing a first alternative engine embodiment.
Figure 5:
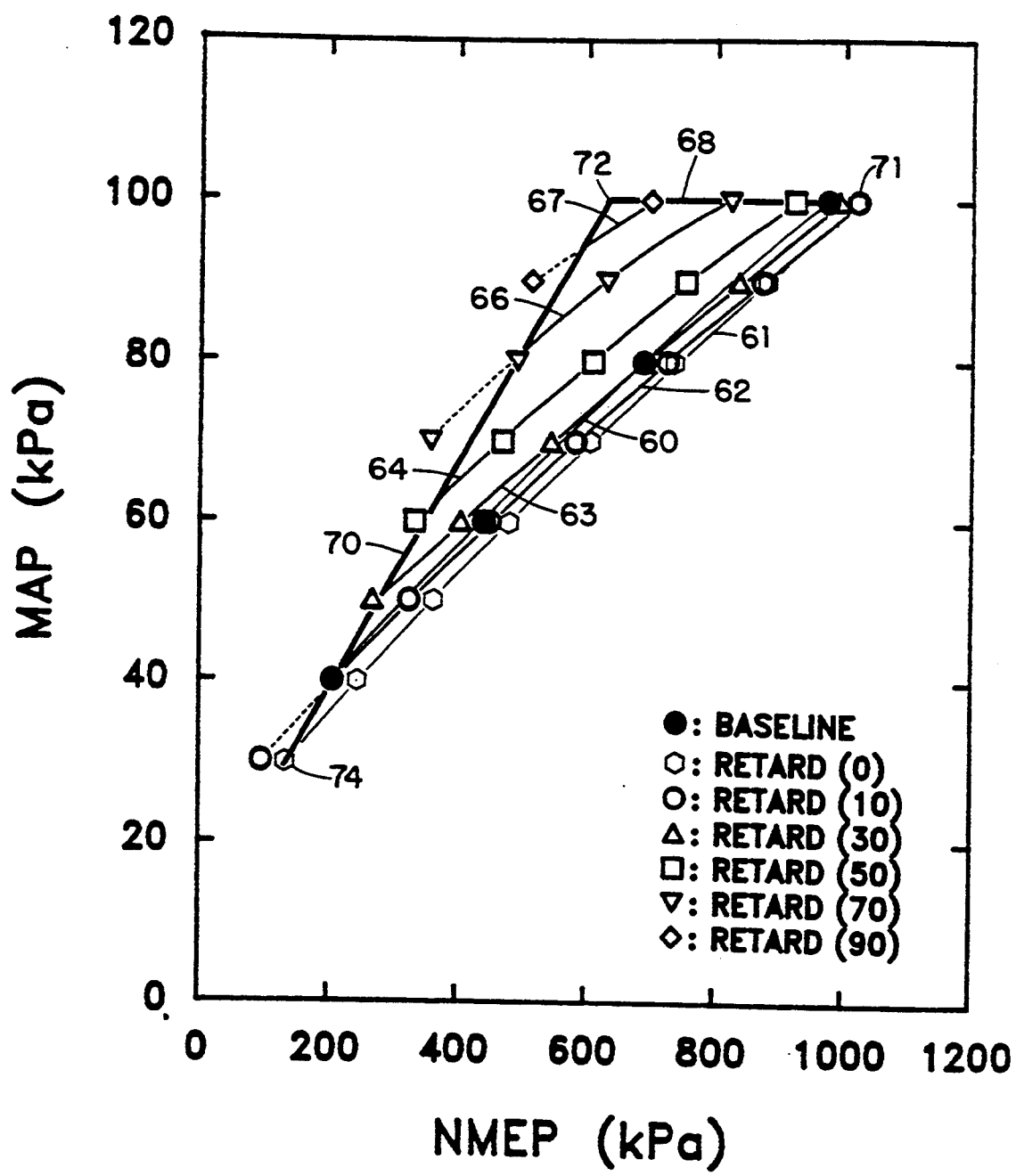
FIG. 5 is a graph showing an alternative operating method for the engine of FIG. 4.

FIGS. 4 and 5 illustrate an alternative embodiment of engine and method according to the invention. The engine 58 is similar to engine 10 of FIG. 1 except that the variable timing valve actuation means 59 acts only upon the exhaust valves 20 of the engine.

Any suitable variable timing device may be used as means 59 which is capable of retarding the exhaust valve closing event a substantial amount of up to about 100° of crankshaft rotation from the nominal full load position. While a continuous variation over the range is preferable, a multiple-step or two-step valve lifter and cam arrangement similar to that disclosed in U.S. Pat. No. 5,090,364 issued Feb. 25, 1992 and entitled TWO-STEP VALVE OPERATING MECHANISM might be used to obtain some of the improved results of the invention.

FIG. 5 illustrates the computer simulation of the operation according to the invention of an engine 58 having continuously variable exhaust valve closing timing. Fine lines 60, 61, 62, 63, 64, 66, 67 indicate operation at baseline of 0° without check valves and then with check valves with 0°, 10°, 30°, 50°, 70° and 90° of exhaust valve retard from the nominal full load phase setting. The heavy line made up of segments 68, 70 comprises the operating line for most efficient operation under the invention. Starting at the full load point 71, load is reduced along segment 68 to point 72 solely by progressively delaying the timing of exhaust valve closing (EVC) up to about 100°. Further timing retard would cause engine operation, in the simulated instance, to fall outside of the zone of acceptable combustion performance (to the right of segment 70). Accordingly, additional load reduction is accomplished by moving down segment 70 by progressively closing the throttle 32 while returning EVC timing from the maximum at point 72 to near the initial 0° retard reached at point 74.

Figure 6:
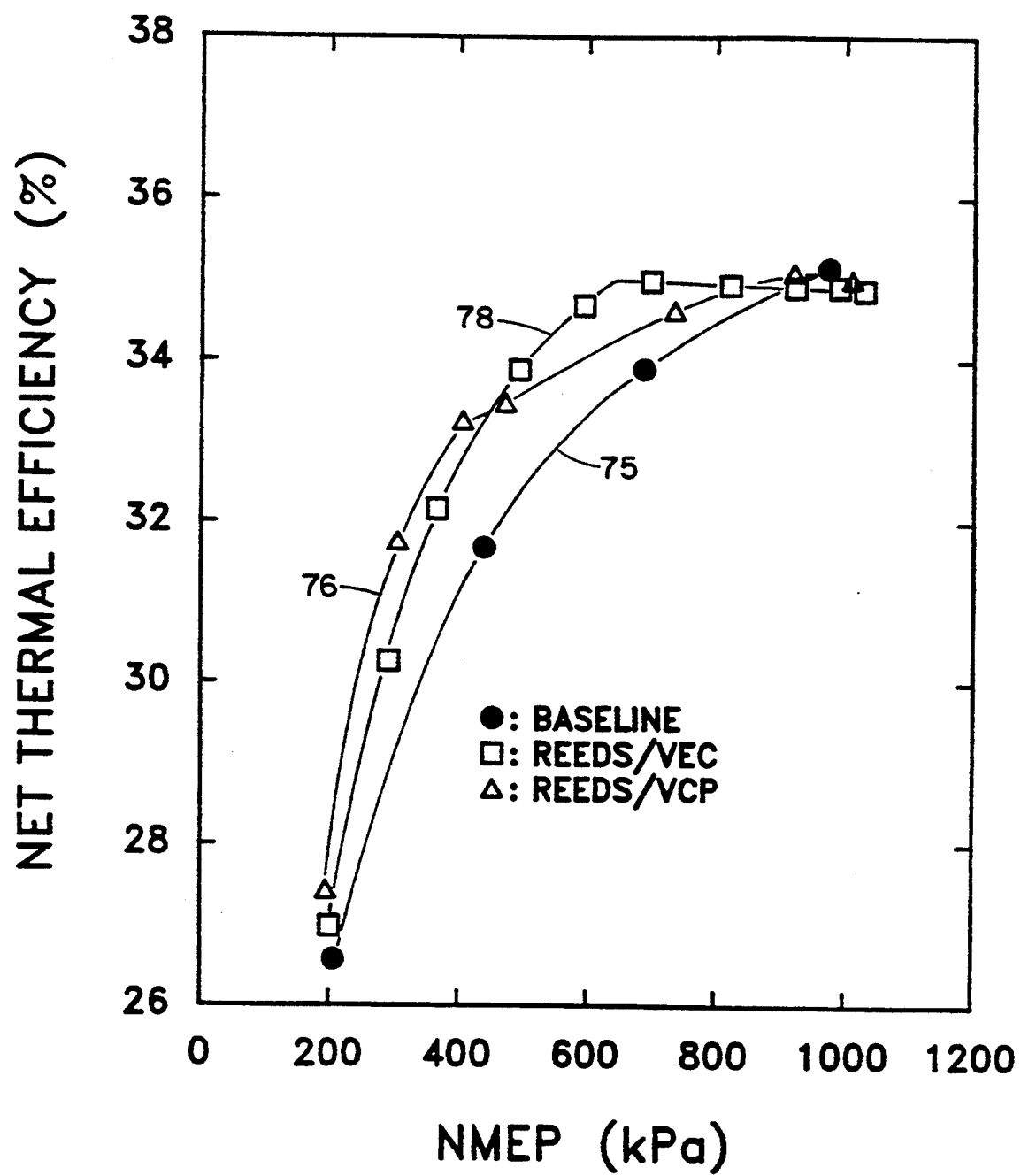
FIG. 6 is a graph comparing efficiency of the methods of FIGS. 3 and 5 with that of a baseline engine.

FIG. 6 shows the comparative thermal efficiencies computed for a baseline engine without intake reed valves or variable exhaust valve timing shown by line 75, an engine as in FIG. 1 with reed valves and variable camshaft phasing (VCP) shown by line 76 and an engine as in FIG. 4 with reed valves and variable exhaust valve closing (VEC) shown by line 78. The greater high load efficiency of the VEC timing (line 78) is attributed in part to the limitation on timing retard in the VCP system (line 76) that varies the timing of both intake and exhaust valves.

If desired, further enhancement in engine performance of the two previous embodiments of the invention having intake check valves 34 may be obtaining by adding to their systems the features disclosed in either U.S. Pat. No. 4,986,225 issued Jan. 22, 1991 and entitled INTAKE RESERVOIR SYSTEM FOR AN ENGINE HAVING A CHECK VALVE or in U.S. Pat. No. 4,991,547 issued Feb. 12, 1992 and entitled INTAKE PORT PRESSURE CONTROL SYSTEM FOR ENGINE INDUCTION SYSTEM. The subject matter of these patents is incorporated by reference herein.

Figure 7:
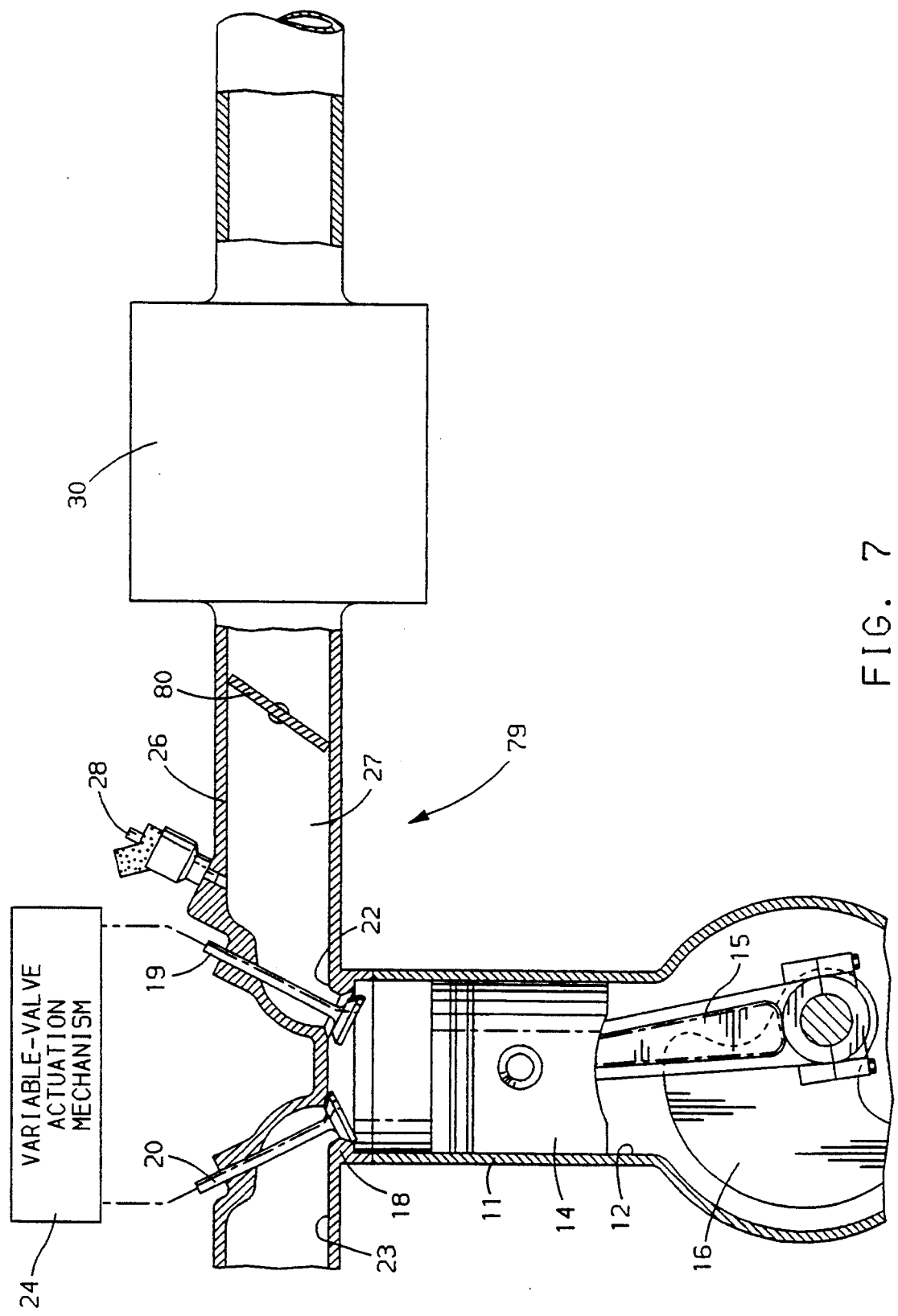
FIG. 7 is a schematic view of a second alternative engine embodiment.
Figure 8:
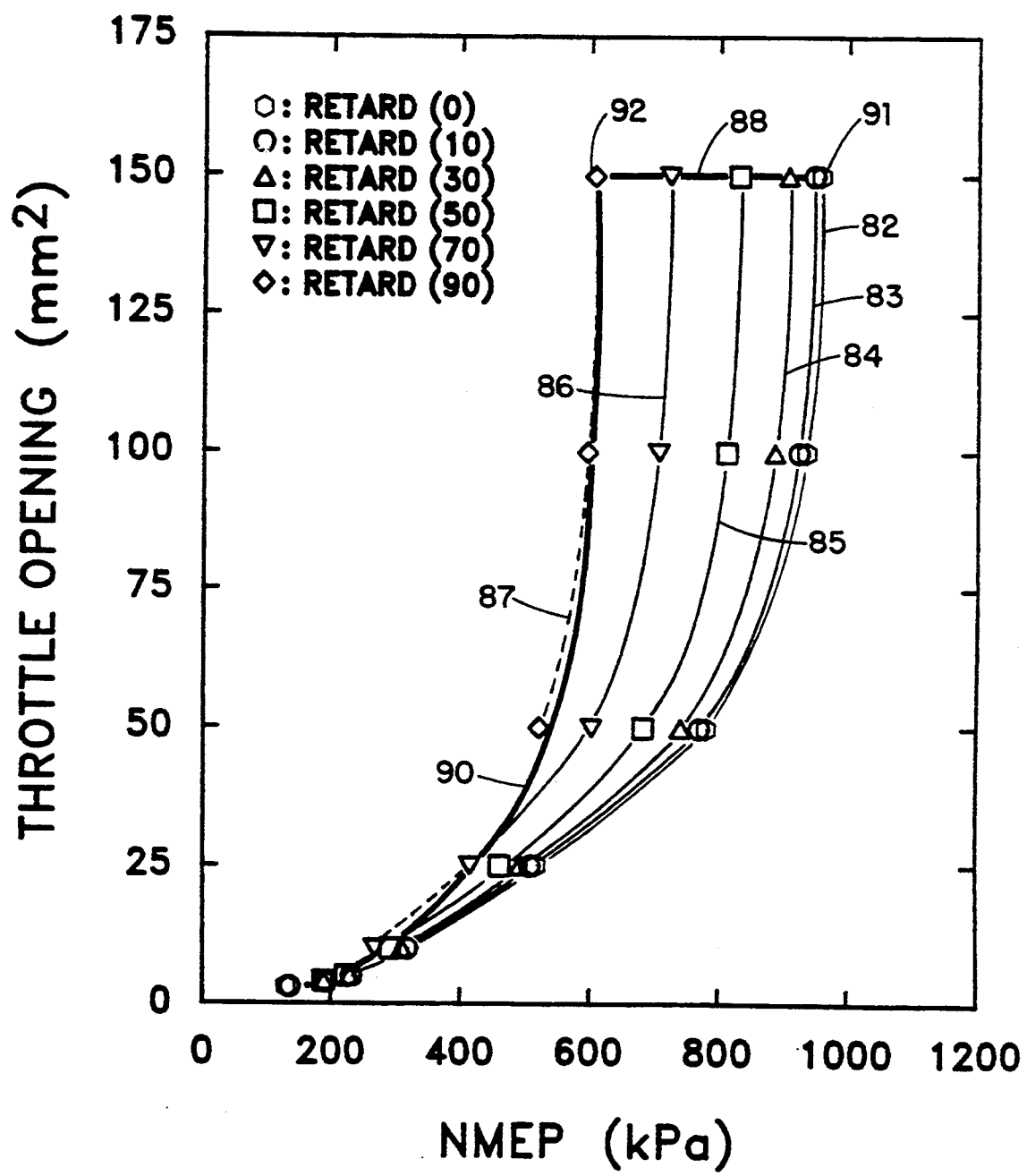
FIG. 8 is a graph showing an alternative operating method for the engine of FIG. 7.

Still another alternative embodiment of the invention is illustrated in FIGS. 7 and 8. FIG. 7 shows an engine 79 similar to engine 10 of FIG. 1 except that the reed valves 34 and the main throttle 32 are omitted and are replaced by individual cylinder throttles 80 located in the intake passages 27 between the intake plenum 30 and the fuel injectors 28.

The preferred method of operation is indicated in FIG. 8 for 1500 rpm as an example. Fine lines 82, 83, 84, 85, 86, 87 indicate retard of the valve timing, or particularly the timing of exhaust valve closing, of 0°, 10°, 30°, 50°, 70° and 90°, respectively. The heavy line made up of horizontal segment 88 and downwardly curving segment 90 indicates the manner of engine operation.

In operation, engine load or power control is accomplished by a combination of control of the timing of exhaust valve closing and throttling with the individual cylinder throttles in the intake runner passages. Full power operation occurs with the throttles 80 sufficiently open and the normal unretarded timing of exhaust valve closing. This occurs at or near point 91 of FIG. 8. Load reduction to the lower limit of efficient combustion (about 600 kPa NMEP) at point 92 occurs along line 88 by progressively retarding exhaust valve closing from 0° to 90° while the throttles 80 remain fully open. Further load reduction along line 90 requires progressive closing of the throttles and advancing of the exhaust valve closing timing back to about its full load timing when the throttles are at minimum load position.

The restriction of the individual cylinder throttles has an effect similar to that of the reed valves used in other embodiments in restricting the backflow of exhaust gases into the manifold. Restriction in the cylinder inflow direction also causes an effective intake delay similar to that obtained by retarding exhaust valve closing as subsequently described.

Figure 9:
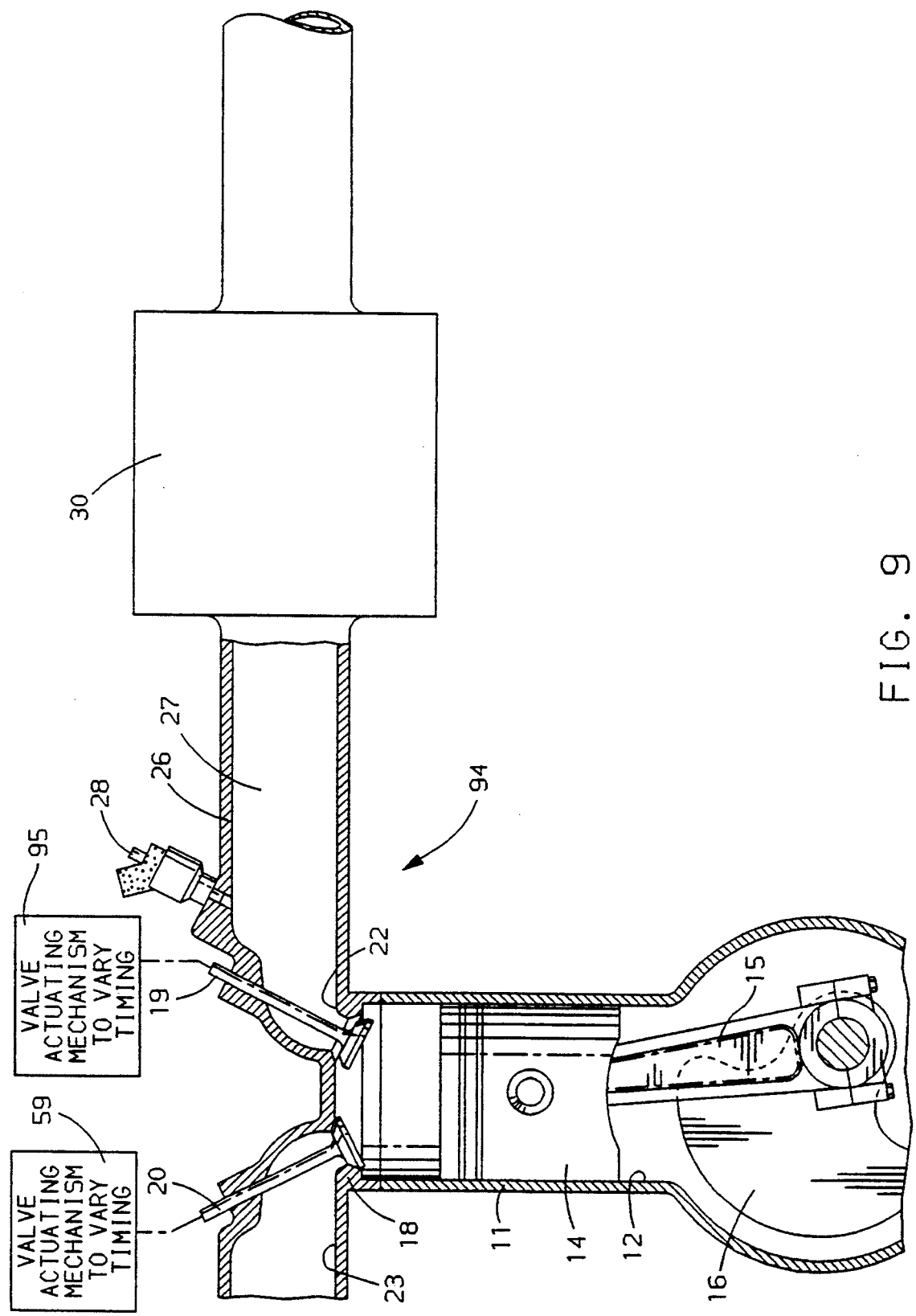
FIG. 9 is a schematic view of a third alternative engine embodiment.
Figure 10A:
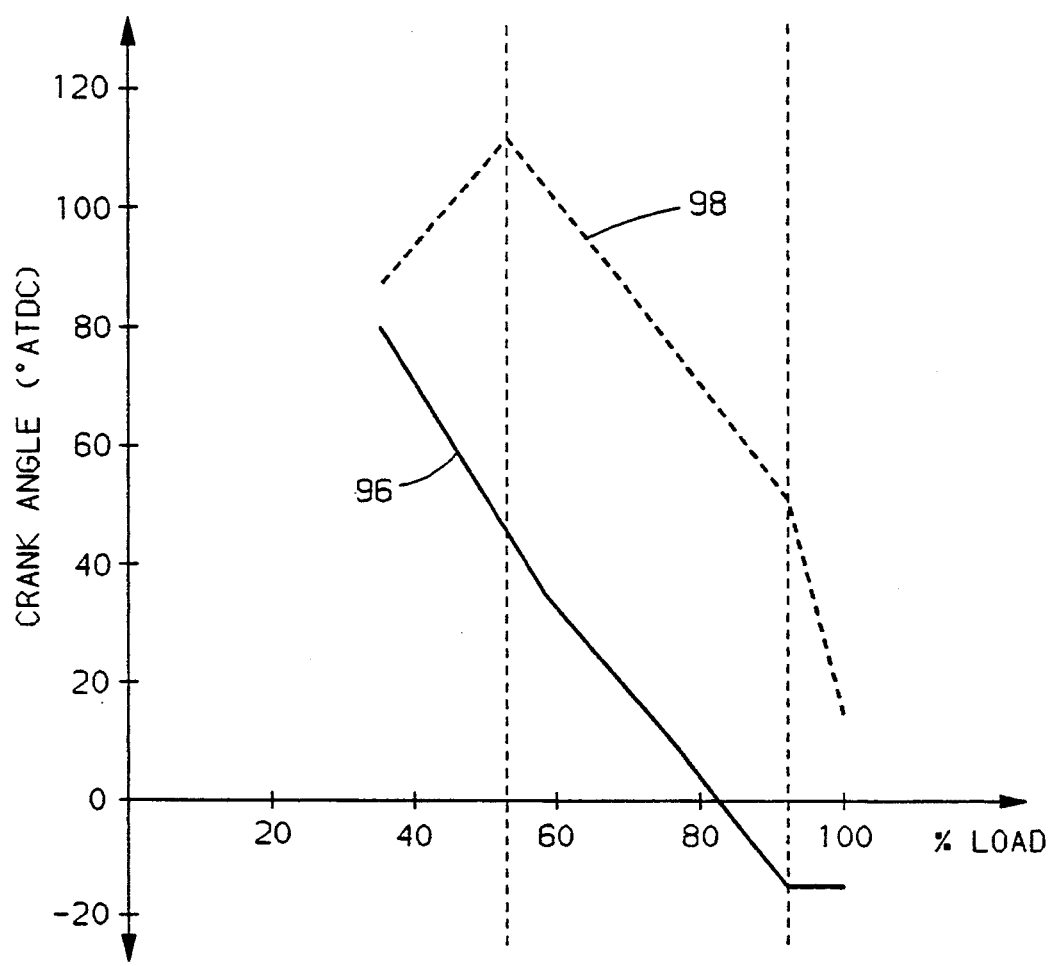
FIGS. 10A and 10B are graphs showing an alternative operating method and the expected efficiency improvement for the engine of FIG. 9.
Figure 10B:
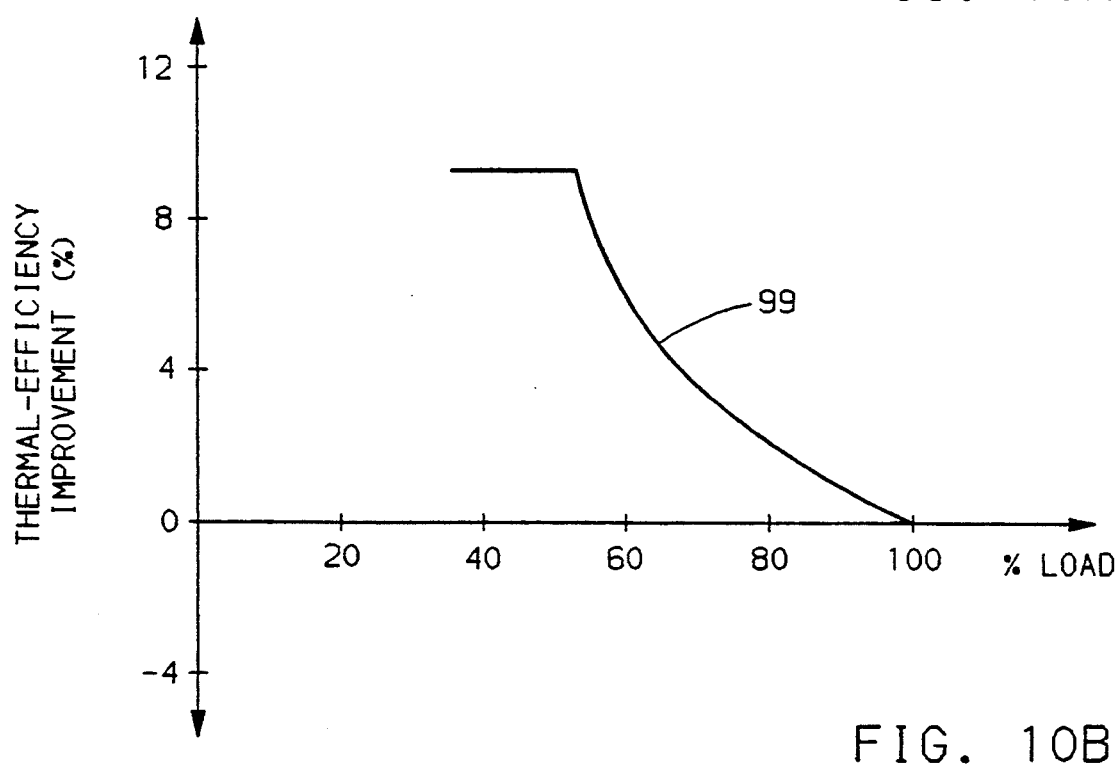

FIGS. 9, 10A and 10B disclose another engine embodiment and operational method which form, in a broader sense, another form of the invention. Engine 94 in FIG. 9 differs from the engine 58 of FIG. 4 in the omission of the main throttle 32 and the reed check valve 34 of the prior embodiment. Instead engine 94 includes a variable timing valve actuator 95 for the intake valve(s) 19 in addition to the previous valve actuator 59 for the exhaust valves 20. As before, the actuator 59 is capable of retarding the timing of exhaust valve closing up to 100° or more from the normal full load setting. Similarly, the added actuator 95 is capable of retarding the timing of the intake valve opening a similar amount.

The method for controlling the engine 94 is illustrated in FIGS. 10A and 10B for 1500 rpm. In FIG. 10A, solid line 96 represents intake valve opening timing and dashed line 98 represents exhaust valve closing timing, both in crank angle degrees at an indicated percent of full load. In FIG. 10B solid line 99 indicates the predicted percent improvement in thermal efficiency at the selected load figures.

At full (100%) load the valve timing is set for maximum power at the points indicated for 100% load. To reduce power, the initial step is to retard exhaust valve closing (EVC) timing without changing the other timing parameters. In the figure, a retard from about 15° to about 55° ATDC (after top dead center) lowers the load to about 90% by introducing exhaust Gas charge dilution.

Further load reduction to about 55% is accomplished by further retarding EVC to about 110° ATDC while also retarding intake valve opening (IVO) timing a similar amount from about 15° BTDC (before top dead center) to about 40° ATDC. This limits the admission of fresh charge and replaces it with additional exhaust gas up to the limit for efficient cylinder combustion.

Thereafter, further load reduction requires limiting the mass of the charge without further dilution. This could be accomplished by throttling as in the earlier disclosed embodiments of the invention. However, in this instance, the IVO is further retarded to reduce the fresh charge admitted and the EVC is equivalently advanced to reduce the admission of exhaust gas in a proportional manner. If complete load reduction to idle operation cannot be obtained by this method, then intake throttling can be introduced as necessary to reach the desired lower load conditions.

As indicated by line 99 in FIG. 10B, the method is projected to obtain efficiency over a conventionally throttled engine increasing up to about 10% at maximum dilution occurring about 55% load and holding this improvement through an indefinite range of lower partial load points in which throttling is not required.

It is apparent that the various methods and embodiments of the invention described herein as examples have in common the following elements of their methods:

1. Initially, engine load or power is reduced by retarding EVC timing to increase charge dilution with exhaust gas up to an operating limit while reducing engine pumping work loss without reducing the effective cylinder compression ratio.

2. Secondarily, the mass of the cylinder charge is further reduced by throttling the inlet or retarding IVO timing to obtain a similar effect while preventing further dilution by advancing exhaust valve closing timing.

The reed check valves used in the first two embodiments prevent exhaust backflow and also provide a resistance that favors the flow of exhaust gas over fresh charge into the cylinder as long as the exhaust valve is open. The cylinders throttles of the third embodiment have a similar effect. In the last embodiment described, retarding of IVO timing provides this function. The bypass flow and external exhaust recirculation systems of previously mentioned U.S. Pat. Nos. 4,986,225 and 4,991,547 as well as other external exhaust recirculation means may be substituted for some of the internal charge dilution measures discussed if desired.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A method of operating a four stroke cycle engine having cylinders each with at least one intake valve and one exhaust valve, pistons in the cylinders and connected with a crankshaft for timed reciprocation, means for varying intake charge pressure provided to the intake valves and means for varying the timing of exhaust valve closing relative to the crank angle of the associated pistons, the method comprising the operating conditions of:

providing a desired maximum intake charge pressure to the intake valves and a selected valve timing for operation of the engine at maximum rated power at various operating speeds;

reducing power for operation in a high power range immediately below maximum power by increasingly delaying exhaust valve closing up to a maximum delay selected to avoid adversely affecting charge combustion in the cylinders; and completing power reduction for operation in a low power range above idle by reducing intake charge pressure to the intake valves while advancing exhaust valve closing timing back to substantially the initial timing setting.

2. The invention as in claim 1 and further including reducing power from the high power range in an intermediate power range above the low power range by reducing intake charge pressure while maintaining exhaust valve closing delay substantially constant.

3. The invention as in claim 1 wherein each cylinder has at least two exhaust valves and the exhaust valve closing timing of at least one of the valves remains constant during engine operation.

4. The invention as in claim 1 wherein control of the intake charge pressure is provided by a manifold intake throttle.

5. The invention as in claim 1 wherein control of the intake charge pressure is provided by cylinder intake runner throttles.

6. The invention as in claim 1 wherein control of the exhaust valve closing timing is provided by variable valve timing mechanism.

7. The invention as in claim 1 wherein control of the exhaust valve closing timing is provided by camshaft phase changing means which alters the timing of a camshaft that actuates exhaust valves of the engine cylinders.

8. The invention as in claim 7 wherein the camshaft also actuates intake valves of the cylinders.

9. The invention as in claim 7 wherein control of the intake charge pressure is provided by a manifold intake throttle together with cylinder intake check valves upstream of the intake valves.

10. A four stroke cycle engine including cylinders each with at least one intake valve and one exhaust valve, pistons in the cylinders and connected with a crankshaft for timed reciprocation, the engine further comprising
means for varying intake charge pressure provided to the intake valves,
means for varying the timing of exhaust valve closing relative to the crank angle of the associated pistons, and
means for operating the engine according to a method including the operating conditions of:
providing a desired maximum intake charge pressure to the intake valves and a selected valve timing for operation of the engine at maximum rated power at various operating speeds;
reducing power for operation in a high power range immediately below maximum power by increasingly delaying exhaust valve closing up to a maximum delay selected to avoid adversely affecting charge combustion in the cylinders; and
completing power reduction for operation in a low power range above idle by reducing intake charge pressure to the intake valves and advancing exhaust valve closing timing back to substantially the initial timing setting.

11. The invention as in claim 10 wherein the operating conditions further include reducing power from the high power range in an intermediate power range above the low power range by reducing intake charge pressure while maintaining exhaust valve closing delay substantially constant.

12. The invention as in claim 10 wherein each cylinder has at least two exhaust valves and the exhaust valve closing timing of at least one of the valves remains constant during engine operation.

13. The invention as in claim 10 and further including a manifold intake throttle actuated by the operating means to provide control of the intake charge pressure.

14. The invention as in claim 10 and further including cylinder intake runner throttles actuated by the operating means to provide control of the intake charge pressure.

15. The invention as in claim 10 and further including variable valve timing mechanism actuated by the operating means to provide control of the exhaust valve closing timing.

16. The invention as in claim 10 and further including camshaft phase changing means operable to vary the timing of a camshaft that actuates exhaust valves of the cylinders, the phase changing means being actuated by the operating means to provide control of the exhaust valve closing timing.

17. The invention as in claim 16 wherein the camshaft also actuates intake valves of the cylinders.

18. The invention as in claim 10 wherein the means for varying intake charge pressure include cylinder intake check valves upstream of the intake valves in cylinder intake passages.

19. The invention as in claim 18 wherein the check valves are reed valves.

20. The invention as in claim 4 wherein intake charge pressure is determined in part by cylinder intake check valves upstream of the intake valves.

21. A method of operating a four stroke cycle engine having cylinders each with at least one intake valve and one exhaust valve, pistons in the cylinders and connected with a crankshaft for timed reciprocation, means for varying intake charge pressure provided to the intake valves and means for varying the timing of exhaust valve closing relative to the crank angle of the associated pistons, the method comprising the operating conditions of:
providing a desired maximum intake charge pressure to the intake valves and a selected valve timing for operation of the engine at maximum rated power at various operating speeds;
reducing power for operation in a high power range immediately below maximum power by increasingly delaying exhaust valve closing combined, at least in part, with proportionally delaying intake valve opening up to a maximum delay selected to avoid adversely affecting charge combustion in the cylinders; and
completing power reduction for operation in a low power range above idle by further delaying intake valve opening and advancing exhaust valve closing timing back to substantially the initial timing setting.

22. The invention as in claim 21 wherein an initial portion of the reduction from maximum power is accomplished while maintaining intake valve opening timing constant.

23. A method of operating a four stroke cycle engine having cylinders each with at least one intake valve and one exhaust valve, pistons in the cylinders are connected with a crankshaft for timed reciprocation, means for varying the timing of exhaust valve closing relative to the crank angle of the associated pistons, the method comprising the operating conditions of:
providing a desired maximum intake charge pressure to the intake valves and a selected valve timing for operation of the engine at maximum rated power at various operating speeds;
reducing power for operation in a high power range immediately below minimum power by increasingly delaying exhaust valve closing combined, at least in part, with proportionally delaying intake valve opening up to a maximum delay selected to avoid adversely affecting charge combustion in the cylinders; and
completing power reduction for operation in a low power range above idle by further delaying intake valve opening and advancing exhaust valve closing timing back to substantially the initial timing setting.

24. The invention as in claim 21 wherein an initial portion of the reduction from maximum power is accomplished while maintaining intake valve opening timing constant.

* * * * *